United States Patent [19]
Pekala et al.

[11] Patent Number: 6,020,058
[45] Date of Patent: Feb. 1, 2000

[54] INKJET PRINTING MEDIA

[75] Inventors: Richard W. Pekala, Allison Park; Charles T. Hill, Jr., New Brighton, both of Pa.

[73] Assignee: PPG Industris Ohio, Inc., Cleveland, Ohio

[21] Appl. No.: 08/876,066

[22] Filed: Jun. 13, 1997

[51] Int. Cl.⁷ ..................................... B41M 5/00
[52] U.S. Cl. .................. 428/327; 347/105; 428/195; 428/206; 428/323
[58] Field of Search ............................. 347/105; 428/195, 428/207, 323, 327, 206

[56] References Cited

U.S. PATENT DOCUMENTS

| | | | |
|---|---|---|---|
| 4,542,059 | 9/1985 | Toganoh et al. | 428/141 |
| 4,664,952 | 5/1987 | Arai et al. | 427/256 |
| 4,770,934 | 9/1988 | Yamasaki et al. | 428/331 |
| 4,830,911 | 5/1989 | Kojima | 428/342 |
| 4,910,084 | 3/1990 | Yamasaki et al. | 428/411.1 |
| 4,944,988 | 7/1990 | Yasuda | 428/195 |
| 5,084,338 | 1/1992 | Light | 428/337 |
| 5,271,989 | 12/1993 | Mori et al. | 428/195 |
| 5,418,078 | 5/1995 | Desie et al. | 428/704 |
| 5,478,631 | 12/1995 | Kawano et al. | 428/212 |
| 5,576,088 | 11/1996 | Ogawa et al. | 428/327 |
| 5,750,200 | 5/1998 | Ogawa et al. | 427/361 |
| 5,789,070 | 8/1998 | Shaw-Klein | 428/216 |

*Primary Examiner*—Bruce H. Hess
*Attorney, Agent, or Firm*—George D. Morris

[57] ABSTRACT

A printing medium comprising: (a) a substrate having at least one surface; and (b) a coating on the surface wherein the coating comprises: (1) binder comprising organic polymer, wherein poly(ethylene oxide) having a weight average molecular weight in the range of from 100,000 to 3,000,000 constitutes at least 20 percent by weight of the organic polymer of the binder and wherein the organic polymer of the binder constitutes from 20 to 80 percent by weight of the coating; and (2) finely divided substantially water-insoluble filler particles, of which at least 25 percent by weight are finely divided substantially water-insoluble nonfilm-forming thermoplastic organic polymer particles, wherein the filler particles have a maximum dimension of less than 500 nanometers, are distributed throughout the binder, and constitute from 20 to 80 percent by weight of the coating.

13 Claims, No Drawings

6,020,058

INKJET PRINTING MEDIA

A considerable problem that has arisen from the use of coatings for inkjet printing media is that many of the inks used for inkjet printing coalesce on many of the coatings. There are, unfortunately, many different kinds of inks which are used for inkjet printing and a coated substrate which performs satisfactorily with inks of one type frequently performs less than satisfactorily with inks of another type.

Another problem that has arisen from the use of coated substrates as inkjet printing media is the long drying time of the water-based inks after they have been applied to the coated substrates.

Coating compositions have now been found which result in coated substrates that eliminate or reduce coalescence of a wide variety of inkjet printing inks when applied to the coated substrate. The coating compositions often provide fast drying times. Accordingly, one embodiment of the invention is a coating composition comprising: (a) a volatile aqueous liquid medium; and (b) binder dissolved or dispersed in the volatile aqueous liquid medium, the binder comprising film-forming organic polymer wherein water-soluble poly(ethylene oxide) having a weight average molecular weight in the range of from 100,000 to 3,000,000 constitutes at least 20 percent by weight of the film-forming organic polymer and wherein the film-forming organic polymer constitutes from 20 to 80 percent by weight of the solids of the coating composition; and (c) finely divided substantially water-insoluble filler particles, of which at least 25 percent by weight are finely divided substantially water-insoluble nonfilm-forming thermoplastic organic polymer particles, wherein the filler particles have a maximum dimension of less than 500 nanometers and constitute from 20 to 80 percent by weight of the solids of the coating composition.

Another embodiment of the invention is a printing medium comprising: (a) a substrate having at least one surface; and (b) a coating on the surface wherein the coating comprises: (1) binder comprising organic polymer, wherein poly(ethylene oxide) having a weight average molecular weight in the range of from 100,000 to 3,000,000 constitutes at least 20 percent by weight of the organic polymer of the binder and wherein the organic polymer of the binder constitutes from 20 to 80 percent by weight of the coating; and (2) finely divided substantially water-insoluble filler particles, of which at least 25 percent by weight are finely divided substantially water-insoluble nonfilm-forming thermoplastic organic polymer particles, wherein the filler particles have a maximum dimension of less than 500 nanometers, are distributed throughout the binder and constitute from 20 to 80 percent by weight of the coating. The coating may be substantially nonporous or it may be porous.

Yet another embodiment of the invention is a printing process which comprises applying liquid ink droplets to the printing medium of the second embodiment.

The printing media of the invention may be made by coating a surface of a substrate with the coating composition of the invention and thereafter substantially removing the aqueous liquid medium.

The coating composition can be in the form of an aqueous solution in which case the volatile aqueous liquid medium is a volatile aqueous solvent for the film-forming organic polymer, or the coating composition can be in the form of an aqueous dispersion in which instance the volatile aqueous liquid medium is a volatile aqueous dispersion liquid for at least some of the film-forming organic polymer.

The volatile aqueous liquid medium is predominately water. Small amounts of low boiling volatile water-miscible organic liquids may be intentionally added for particular purposes. Examples of such low boiling volatile water-miscible organic liquids solvents include methanol [CAS 67-56-1], ethanol [CAS 64-17-5], 1-propanol, [CAS 71-23-8], 2-propanol [CAS 67-63-0], 2-butanol [CAS 78-92-2], 2-methyl-2-propanol [CAS 75-65-0], 2-propanone [CAS 67-64-1], and 2-butanone [CAS 78-93-3]. The listing of such liquids is by no means exhaustive.

It is preferred that substantially no low boiling volatile water-miscible organic liquids be intentionally added to the system in order to minimize organic emissions upon drying the coating.

Similarly, water-miscible organic liquids which themselves are of low, moderate, or even negligible volatility may be intentionally added for particular purposes, such as for example, retardation of evaporation. Examples of such organic liquids include 2-methyl-1-propanol [CAS 78-83-1], 1-butanol [CAS 71-36-3], 1,2-ethanediol [CAS 107-21-1], and 1,2,3-propanetriol [CAS 56-81-5]. The listing of such liquids is by no means exhaustive.

It is preferred that substantially no water-miscible organic liquids which are of low, moderate, or negligible volatility be intentionally added to the system.

Notwithstanding the above, those materials which, although not intentionally added for any particular purpose, are normally present as impurities in one or more of the components of the coating compositions of the invention and which become components of the volatile aqueous liquid medium, may be present at low concentrations.

In most instances water constitutes at least 80 percent by weight of the volatile aqueous liquid medium.

Often water constitutes at least 95 percent by weight of the volatile aqueous liquid medium. Preferably water constitutes substantially all of the volatile aqueous liquid medium.

The amount of volatile aqueous liquid medium present in the coating composition may vary widely. The minimum amount is that which will produce a coating composition having a viscosity low enough to apply as a coating. The maximum amount is not governed by any theory, but by practical considerations such as the cost of the liquid medium, the minimum desired thickness of the coating to be deposited, and the cost and time required to remove the volatile aqueous liquid medium from the applied wet coating. Usually, however, the volatile aqueous liquid medium constitutes from 75 to 98 percent by weight of the coating composition. In many cases the volatile aqueous liquid medium constitutes from 85 to 98 percent by weight of the coating composition. Often the volatile aqueous liquid medium constitutes from 86 to 96 percent by weight of the coating composition. Preferably the volatile aqueous liquid medium constitutes from 88 to 95 percent by weight of the composition.

Water-soluble poly(ethylene oxide) having a weight average molecular weight in the range of from 100,000 to 3,000,000 is known. Such materials are ordinarily formed by polymerizing ethylene oxide [CAS 75-21-8], usually in the presence of a small amount of an initiator such as low molecular weight glycol or triol. Examples of such initiators include ethylene glycol [CAS 107-21-1], diethylene glycol [CAS 111-46-6], triethylene glycol [CAS 112-27-6], tetraethylene glycol [CAS 112-60-7], propylene glycol [CAS 57-55-6], trimethylene glycol [CAS 504-63-2], dipropylene glycol [CAS 110-98-5], glycerol [CAS 56-81-5), trimethylolpropane [CAS 77-99-6], and α,ω-diaminopoly(propylene glycol) (CAS 9046-10-0]. One or more other lower alkylene oxides such as propylene oxide [CAS 75-56-9] and trimethylene oxide [CAS 503-30-0] may also be employed as comonomer with the ethylene oxide, whether to form random polymers or block polymers, but they should be used only in those small amounts as will not render the resulting polymer both water-insoluble and nondispersible in water. As used herein and in the claims, the term "poly(ethylene oxide)" is intended to include the foregoing copolymers of ethylene oxide with small amounts of lower alkylene oxide, as well as homopolymers of ethylene oxide. The configuration of the poly(ethylene oxide) can be linear, branched, comb, or star-shaped. The preferred terminal groups of the poly(ethylene oxide) are hydroxyl groups, but terminal lower alkoxy groups such as methoxy groups may be present provided their types and numbers do not render the poly (ethylene oxide) polymer unsuitable for its purpose. In most cases the poly(ethylene oxide) having a weight average molecular weight in the range of from 100,000 to 3,000,000 is water-soluble. The preferred poly(ethylene oxide) having a weight average molecular weight in the range of from 100,000 to 3,000,000 is a water-soluble homopolymer of ethylene oxide produced using a small amount of ethylene glycol as an initiator.

The weight average molecular weight of the water-soluble poly(ethylene oxide) is in the range of from 100,000 to 3,000,000. Often the weight average molecular weight of the water-soluble poly(ethylene oxide) is in the range of from 150,000 to 1,000,000. Frequently the weight average molecular weight of the water-soluble poly(ethylene oxide) is in the range of from 200,000 to 1,000,000. From 300,000 to 700,000 is preferred.

Usually the water-soluble poly(ethylene oxide) having a weight average molecular weight in the range of from 100,000 to 3,000,000 constitutes at least 20 percent by weight of the organic polymer of the binder. Generally the water-soluble poly(ethylene oxide) having a weight average molecular weight in the range of from 100,000 to 3,000,000 constitutes at least 51 percent by weight of the organic polymer of the binder. In many instances the water-soluble poly(ethylene oxide) having a weight average molecular weight in the range of from 100,000 to 3,000,000 constitutes at least 60 percent by weight of the organic polymer of the binder. Often the water-soluble poly(ethylene oxide) having a weight average molecular weight in the range of from 100,000 to 3,000,000 constitutes at least 90 percent by weight of the organic polymer of the binder. Frequently the water-soluble poly(ethylene oxide) having a weight average molecular weight in the range of from 100,000 to 3,000,000 constitutes at least 95 percent by weight of the organic polymer of the binder. In many cases the water-soluble poly(ethylene oxide) having a weight average molecular weight in the range of from 100,000 to 3,000,000 constitutes at least 99 percent by weight of the organic polymer of the binder. In some cases the water-soluble poly(ethylene oxide) having a weight average molecular weight in the range of from 100,000 to 3,000,000 constitutes 100 percent by weight of the organic polymer of the binder.

The film-forming organic polymer of the binder of the coating composition may optionally also comprise additional organic polymer other than water-soluble poly (ethylene oxide) having a weight average molecular weight in the range of from 100,000 to 3,000,000. Such additional organic polymer may be (1) one or more film-forming organic polymers, (2) one or more organic polymers which by themselves are not film-forming provided their identities and amounts do not preclude the total organic polymer of the binder of the coating composition from being film-forming, or (3) a mixture of both one or more film-forming organic polymers and one or more organic polymers which are not film-forming provided that the identities and amounts of the organic polymers which are not film-forming do not preclude the total organic polymer of the binder of the coating composition from being film-forming.

Examples of additional film-forming organic polymers include, but are not limited to, water-soluble poly(ethylene oxide) having a weight average molecular weight below 100,000, water-soluble poly(ethylene oxide) having a weight average molecular weight above 3,000,000, water-soluble cellulosic organic polymers, water-soluble noncellulosic organic polymers, water dispersible polymers such as poly(ethylene-co-acrylic acid), or a mixture of two or more thereof.

There are many widely varying types of water-soluble cellulosic organic polymers which may be employed in the present invention. Of these, the water-soluble cellulose ethers are preferred water-soluble cellulosic organic polymers. Many of the water-soluble cellulose ethers are also excellent water retention agents. Examples of the water-soluble cellulose ethers include water-soluble methylcellulose [CAS 9004-67-5], water-soluble carboxymethylcellulose, water-soluble sodium carboxymethylcellulose [CAS 9004-32-4], water-soluble ethylmethylcellulose, water-soluble hydroxyethylmethylcellulose [CAS 9032-42-2], water-soluble hydroxypropylmethylcellulose [CAS 9004-65-3], water-soluble hydroxyethylcellulose [CAS 9004-62-0], water-soluble ethylhydroxyethylcellulose, water-soluble sodium carboxymethylhydroxyethylcellulose, water-soluble hydroxypropylcellulose [CAS 9004-64-2], water-soluble hydroxybutylcellulose [CAS 37208-08-5], water-soluble hydroxybutylmethylcellulose [CAS 9041-56-9] and water-soluble cellulose sulfate sodium salt [CAS 9005-22-5]. Water-soluble hydroxypropylcellulose is preferred.

Water-soluble hydroxypropylcellulose is a known material and is available commercially in several different weight average molecular weights. The weight average molecular weight of the water-soluble hydroxypropylcellulose used in the present invention can vary widely, but usually it is in the range of from 100,000 to 1,000,000. Often the weight average molecular weight is in the range of from 100,000 to 500,000. From 200,000 to 400,000 is preferred. Two or more water-soluble hydroxypropylcelluloses having different weight average molecular weights may be admixed to obtain a water-soluble hydroxypropyl cellulose having a differing weight average molecular weight.

Similarly, there are many widely varying kinds of water-soluble noncellulosic organic polymers which may be employed in the present invention. Examples of the water-soluble noncellulosic organic polymers include water-soluble poly(vinyl alcohol), water-soluble poly (vinylpyrrolidone), water-soluble poly(vinylpyridine), water-soluble poly(ethylene oxide), water-soluble poly (ethylenimine), water-soluble ethoxylated poly (ethylenimine), water-soluble poly(ethylenimine)-epichlorohydrin, water-soluble polyacrylate, water-soluble sodium polyacrylate, water-soluble poly(acrylamide), water-soluble carboxy modified poly(vinyl alcohol), water-soluble poly(2-acrylamido-2-methylpropane sulfonic acid), water-soluble poly(styrene sulfonate), water-soluble vinyl methyl ether/maleic acid copolymer, water-soluble styrene-maleic anhydride copolymer, water-soluble ethylene-maleic anhydride copolymer, water-soluble acrylamide/acrylic acid copolymer, water-soluble poly(diethylene triamine-co-adipic acid), water-soluble poly[(dimethylamino)ethyl methacrylate hydrochloride], water-soluble quaternized poly(imidazoline), water-soluble poly(N,N-dimethyl-3,5-dimethylene piperidinium chloride), poly(dimethyldiallylammonium chloride), poly(vinylbenzyltrimethylammonium chloride), water-soluble poly(vinylpyridinium halide), water-soluble poly[(methacryloyloxyethyl)(2-hydroxyethyl)dimethylammonium chloride], water-soluble poly(alkylenepolyaminedicyandiamide ammonium condensate), water-soluble poly((meth)acrylamidealkyl quaternary salts, water-soluble starch, water-soluble oxidized starch, water-soluble cationized starch, water-soluble casein, water-soluble gelatin, water-soluble sodium alginate, water-soluble carrageenan, water-soluble dextran, water-soluble gum arabic, water-soluble pectin, water-soluble albumin, and water-soluble agar-agar. Water-soluble poly(vinyl alcohol) is preferred.

Water-soluble poly(vinyl alcohol) may be broadly classified as one of two types. The first type is fully hydrolyzed water-soluble poly(vinyl alcohol) in which less than 1.5 mole percent acetate groups are left on the molecule. The second type is partially hydrolyzed water-soluble poly(vinyl alcohol) in which from 1.5 to as much as 20 mole percent acetate groups are left on the molecule. The water-soluble organic polymer may comprise either type or a mixture of both.

Examples of water-soluble polyacrylates which can advantageously be used include the water-soluble anionic polyacrylates and the water-soluble cationic polyacrylates. Water-soluble anionic polyacrylates are themselves well known. Usually, but not necessarily, they are copolymers of one or more (meth)acrylic esters and enough (meth)acrylic acid and/or (meth)acrylic acid salt to provide sufficient carboxylate anions to render the polymer water-soluble. Similarly, water-soluble cationic polyacrylates are themselves well known. Usually, but not necessarily, they are copolymers of one or more (meth)acrylic esters and enough amino-functional ester of (meth)acrylic acid to provide sufficient ammonium cations to render the acrylic polymer water-soluble. Such ammonium cations may be primary, secondary, tertiary, or quaternary. Usually the water-soluble cationic polyacrylate is a primary, secondary, tertiary, or quaternary ammonium salt, or it is a quaternary ammonium hydroxide.

When optional additional organic polymer is present in the binder, it usually constitutes from 1 to 80 percent by weight of the organic polymer of the binder. Frequently the optional additional organic polymer constitutes from 1 to 49 percent by weight of the organic polymer of the binder. In many cases the optional additional organic polymer constitutes from 1 to 40 percent by weight of the organic polymer of the binder. Often the optional additional organic polymer constitutes from 1 to 10 percent by weight of the organic polymer of the binder. Frequently the optional additional organic polymer, when present, constitutes from 1 to 5 percent by weight of the organic polymer of the binder.

The amount of film-forming organic polymer of the coating composition present in the solids of the coating compositions of the present invention, and the amount of organic polymer of the binder of the coating present in the coatings of the present invention, are critical. Coatings of the present invention which contain insufficient organic polymer in the binder do not provide the water absorption necessary for fast drying of most inkjet inks. Coatings of the present invention which contain insufficient finely divided substantially water-insoluble filler particles similarly do not provide for fast drying of most inkjet inks. In both instances the ancillary results are untoward ink migration and poor printed image quality.

The amount of film-forming organic polymer of the coating composition constitutes from 20 to 80 percent by weight of the solids of the coating composition. In many cases the film-forming organic polymer constitutes from 25 to 75 percent by weight of the solids of the coating composition. From 35 to 70 percent by weight is preferred.

Similarly, the amount of organic polymer of the binder of the coating constitutes from 20 to 80 percent by weight of the coating. Often the organic polymer of the binder constitutes from 25 to 75 percent by weight of the coating. From 35 to 70 percent by weight is preferred.

The organic polymer of the binder of the coating may or may not be insolubilized after application of the coating composition to the substrate. As used herein and in the claims, insolubilized organic polymer is organic polymer which is water-soluble or water-dispersed when applied to the substrate and which is completely or partially insolubilized after such application. Insolubilization may be accomplished through use of insolubilizer. Insolubilizers generally function as crosslinking agents. Preferably the insolubilizer reacts with functional groups of at least a portion of the organic polymer to provide the desired degree of insolubilization to the total organic polymer of the coating.

There are many available insolubilizers which may optionally be used. Examples of suitable insolubilizers include, but are not limited to, Curesan® 199 insolubilizer (PPG Industries, Inc., Pittsburgh, Pa.), Curesan® 200 insolubilizer (PPG Industries, Inc.), Sequarez® 700C insolubilizer (Sequa Chemicals, Inc., Chester, S.C.), Sequarez® 700M insolubilizer (Sequa Chemicals, Inc.), Sequarez® 755 insolubilizer (Sequa Chemicals, Inc.), Sequarez® 770 insolubilizer (Sequa Chemicals, Inc.), Berset® 39 insolubilizer (Bercen Inc., Cranston, R.I.), Berset® 47 insolubilizer (Bercen Inc.), Berset® 2185 insolubilizer (Bercen Inc.), and Berset® 2586 insolubilizer (Bercen Inc.).

When used, the amount of insolubilizer present in the binder of the coating composition may vary considerably. In such instances the weight ratio of the insolubilizer to the organic polymer is usually in the range of from 0.05:100 to 15:100. Often the weight ratio is in the range of from 1:100 to 10:100. From 2:100 to 5:100 is preferred. These ratios are on the basis of insolubilizer dry solids and organic polymer dry solids.

The finely divided substantially water-insoluble filler particles may be finely divided substantially water-insoluble nonfilm-forming thermoplastic organic polymer particles, finely divided substantially water-insoluble inorganic filler particles, finely divided substantially water-insoluble thermoset organic particles, or a mixture thereof, provided that at least 25 percent by weight of the finely divided substantially water-insoluble filler particles are finely divided substantially water-insoluble nonfilm-forming thermoplastic organic polymer particles.

The finely divided substantially water-insoluble nonfilm-forming thermoplastic organic polymer particles are thermoplastic in that they may be softened and/or melted at elevated temperatures. Nevertheless they are nonfilm-forming when used in accordance with this invention. Examples of suitable finely divided substantially water-insoluble nonfilm-forming thermoplastic organic polymer particles include polyethylene particles such as those contained in Poly Emulsion 316N30 sol (ChemCor Inc., Chester, N.Y.), maleated polypropylene particles such as those contained in Poly Emulsion 43C30 sol (ChemCor Inc., Chester, N.Y.), and polyacrylate, polymethacrylate, polystyrene, and/or fluoropolymer particles made by microemulsion processes.

The finely divided substantially water-insoluble inorganic filler particles which may optionally be present are often finely divided substantially water-insoluble particles of metal oxide. The metal oxide constituting the particles may be a simple metal oxide (i.e., the oxide of a single metal) or it may be a complex metal oxide (i.e., the oxide of two or more metals). The particles of metal oxide may be particles of a single metal oxide or they may be a mixture of different particles of different metal oxides.

Examples of suitable metal oxides include alumina, silica, and titania. Other oxides may optionally be present in minor amount. Examples of such optional oxides include, but are not limited to, zirconia, hafnia, and yttria. Other metal oxides that may optionally be present are those which are ordinarily present as impurities such as for example, iron oxide. For purposes of the present specification and claims, silicon is considered to be a metal.

When the particles are particles of alumina, most often the alumina is alumina monohydroxide. Particles of alumina monohydroxide, AlO(OH), and their preparation are known. The preparation and properties of alumina monohydroxide are described by B. E. Yoldas in *The American Ceramic Society Bulletin*, Vol. 54, No. 3, (March 1975), pages 289–290, in *Journal of Applied Chemical Biotechnology*, Vol. 23 (1973), pages 803–809, and in *Journal of Materials Science*, Vol. 10 (1975), pages 1856–1860. Briefly, aluminum isopropoxide or aluminum secondary-butoxide are hydrolyzed in an excess of water with vigorous agitation at from 75 C to 80° C. to form a slurry of aluminum monohydroxide. The aluminum monohydroxide is then peptized at temperatures of at least 80° C. with an acid to form a clear alumina monohydroxide sol which exhibits the Tyndall effect when illuminated with a narrow beam of light. Since the alumina monohydroxide of the sol is neither white nor colored, it is not a pigment and does not function as a pigment in the present invention. The acid employed is noncomplexing with aluminum, and it has sufficient strength to produce the required charge effect at low concentration. Nitric acid, hydrochloric acid, perchloric acid, acetic acid, chloroacetic acid, and formic acid meet these requirements. The acid concentration is usually in the range of from 0.03 to 0.1 mole of acid per mole of aluminum alkoxide. Although it is desired not to be bound by any theory, it is believed that the alumina monohydroxide produced in this manner is pseudo-boehmite. Pseudo-boehmite is indeed the preferred alumina monohydroxide for use in the present invention. The alumina monohydroxide is not a pigment and does not function as a pigment in the present invention. In most instances the alumina monohydroxide is transparent and colorless.

Colloidal silica is also known. Its preparation and properties are described by R. K. Iler in *The Chemistry of Silica*, John Wiley & Sons, Inc., New York (1979) ISBN 0-471-02404-X, pages 312–337, and in U.S. Pat. Nos. 2,601,235; 2,614,993; 2,614,994; 2,617,995; 2,631,134; 2,885,366; and 2,951,044, the disclosures of which are, in their entireties, incorporated herein by reference. Examples of commercially available colloidal silica include Ludox® HS, LS, SM, TM and CL-X colloidal silica (E. I. du Pont de Nemours & Company, Inc.) in which the counter ion is the sodium ion, and Ludox® AS colloidal silica (E. I. du Pont de Nemours & Company, Inc.) in which the counter ion is the ammonium ion. Another example is Ludox® AM colloidal silica (E. I. du Pont de Nemours & Company, Inc.) in which some of the silicon atoms have been replaced by aluminum atoms and the counter ion is the sodium ion.

Colloidal titania is also known. Its preparation and properties are described in U.S. Pat. No. 4,275,118. Colloidal titania may also be prepared by reacting titanium isopropoxide [CAS 546-68-9] with water and tetramethyl ammonium hydroxide.

Finely divided substantially water-insoluble thermoset organic filler particles may optionally be present. Thermoset organic polymer is organic polymer crosslinked at least to the extent that it cannot be significantly softened or remelted by heat. Examples of such thermoset organic polymers include thermoset melamine-aldehyde polymer, thermoset resorcinol-aldehyde polymer, thermoset phenol- resorcinol-aldehyde polymer, thermoset (meth)acrylate polymer, and thermoset styrene-divinylbenzene polymer.

The filler particles have a maximum dimension of less than 500 nanometers. Often the filler particles have a maximum dimension of less than 100 nanometers. Frequently the maximum dimension is less than 50 nanometers. Preferably the maximum dimension is less than 20 nanometers.

As used herein and in the claims the maximum dimension of the filler particles is determined by transmission electron microscopy.

At least 25 percent by weight of the finely divided substantially water-insoluble filler particles are finely divided substantially water-insoluble nonfilm-forming thermoplastic organic polymer particles. Often at least 50 percent by weight of the finely divided substantially water-insoluble filler particles are finely divided substantially water-insoluble nonfilm-forming thermoplastic organic polymer particles. Frequently at least 75 percent by weight of the finely divided substantially water-insoluble filler particles are finely divided substantially water-insoluble nonfilm-forming thermoplastic organic polymer particles. When desired, substantially 100 percent by weight of the finely divided substantially water-insoluble filler particles are finely divided substantially water-insoluble nonfilm-forming thermoplastic organic polymer particles.

The amount of the finely divided substantially water-insoluble filler particles in the coating or in the solids of the coating composition, as the case may be, is critical for the same reasons given above in respect of the amount of film-forming organic polymer present in the solids of the coating composition and the amount of organic polymer of the binder present in the coating.

The finely divided substantially water-insoluble filler particles constitute from 20 to 80 percent by weight of the coating or of the solids of the coating composition. In any cases the finely divided substantially Water-insoluble filler particles constitute from 25 to 75 percent by weight of the coating or of the solids of the coating composition. From 30 to 65 percent by weight is preferred. As used herein and in the claims, "solids of the coating composition", is the residue remaining after the solvent and any other volatile materials have been substantially removed from the coating composition by drying to form a coating in accordance with good coatings practice.

The finely divided substantially water-insoluble filler particles having a maximum dimension of less than 500 nanometers and the binder together usually constitute from 2 to 25 percent by weight of the coating composition. Frequently such particles and the binder together constitute from 2 to 15 percent by weight of the coating composition. Often such particles and the binder together constitute from 4 to 14 percent by weight of the coating composition. Preferably such particles and the binder together constitute from 5 to 12 percent by weight of the coating composition.

A material which may optionally be present in the coating composition is surfactant. For purposes of the present specification and claims surfactant is considered not to be a part of the organic film-forming polymer of the binder. There are many available surfactants and combinations of surfactants which may be used. Examples of suitable surfactants include, but are not limited to, Fluorad® FC-170-C surfactant (3M Company), and Triton® X-405 surfactant (Union Carbide Corporation).

When used, the amount of surfactant present in the coating composition may vary considerably. In such instances the weight ratio of the surfactant to the poly (ethylene oxide) having a weight average molecular weight in the range of from 100,000 to 3,000,000 is usually in the range of from 0.01:100 to 10:100. In many instances the weight ratio is in the range of from 0.1:100 to 10:100. Often the weight ratio is in the range of from 0.2:100 to 5:100. From 0.5:100 to 2:100 is preferred. These ratios are on the basis of surfactant dry solids and poly(ethylene oxide) dry solids.

There are many other conventional adjuvant materials which may optionally be present in the coating composition. These include such materials as lubricants, waxes, plasticizers, antioxidants, organic solvents, lakes, and pigments. The listing of such materials is by no means exhaustive. These and other ingredients may be employed in their customary amounts for their customary purposes so long as they do not seriously interfere with good coating composition formulating practice.

The pH of the coating composition may vary considerably. In most instances the pH is in the range of from 3 to 10. Often the pH is in the range of from 3.5 to 7. In other instances the pH is in the range of from 7 to 9.

The coating compositions are usually prepared by simply admixing the various ingredients. The ingredients may be mixed in any order. Although the mixing of liquid and solids is usually accomplished at room temperature, elevated temperatures are sometimes used. The maximum temperature which is usable depends upon the heat stability of the ingredients.

The coating compositions are generally applied to the surface of the substrate using any conventional technique known to the art. These include spraying, curtain coating, dipping, rod coating, blade coating, roller application, size press, printing, brushing, drawing, slot-die coating, and extrusion. The coating is then formed by removing the solvent from the applied coating composition. This may be accomplished by any conventional drying technique. Coating composition may be applied once or a multiplicity of times. When the coating composition is applied a multiplicity of times, the applied coating is usually but not necessarily dried, either partially or totally, between coating applications. Once the coating composition has been applied to the substrate, the solvent is substantially removed, usually by drying.

The substrate may be any substrate at least one surface of which is capable of bearing the coating discussed above. In most instances the substrate is in the form of an individual sheet or in the form of a roll, web, strip, film, or foil of material capable of being cut into sheets.

The substrate may be porous throughout, it may be nonporous throughout, or it may comprise both porous regions and nonporous regions.

Examples of porous substrates include paper, paperboard, wood, cloth, nonwoven fabric, felt, unglazed ceramic material, microporous polymer membranes, microporous membranes comprising both polymer and filler particles, porous foam, and microporous foam.

Examples of substrates which are substantially nonporous throughout include sheets or films of organic polymer such as poly(ethylene terephthalate), polyethylene, polypropylene, cellulose acetate, poly(vinyl chloride), and copolymers such as saran. The sheets or films may be filled or unfilled. The sheets or films may be metallized or unmetallized as desired. Additional examples include metal substrates including but not limited to metal foils such as aluminum foil and copper foil. Yet another example is a porous or microporous foam comprising thermoplastic organic polymer which foam has been compressed to such an extent that the resulting deformed material is substantially nonporous. Still another example is glass.

Base stocks which are normally porous such as for example paper, paperboard, wood, cloth, nonwoven fabric, felt, unglazed ceramic material, microporous polymer membranes, microporous membranes comprising both polymer and filler particles, porous foam, or microporous foam may be coated or laminated to render one or more surfaces substantially nonporous and thereby provide substrates having at least one substantially nonporous surface.

The substrate may be substantially transparent, it may be substantially opaque, or it may be of intermediate transparency. For some applications such as inkjet printed overhead slides, the substrate must be sufficiently transparent to be useful for that application. For other applications such as inkjet printed paper, transparency of the substrate is not so important.

The thickness of the coating may vary widely, but in most instances the thickness of the coating is in the range of from 1 to 40 $\mu$m. In many cases the thickness of the coating is in the range of from 5 to 40 $\mu$m. Often the thickness is in the range of from 8 to 30 $\mu$m. From 12 to 18 $\mu$m is preferred.

The coating may be substantially transparent, substantially opaque, or of intermediate transparency. It may be substantially colorless, it may be highly colored, or it may be of an intermediate degree of color. Usually the coating is substantially transparent and substantially colorless. As used herein and in the claims, a coating is substantially transparent if its luminous transmission in the visible region is at least 80 percent of the incident light. Often the luminous transmission of the coating is at least 85 percent of the incident light. Preferably the luminous transmission of the coating is at least 90 percent. Also as used herein and in the claims, a coating is substantially colorless if the luminous transmission is substantially the same for all wavelengths in the visible region, viz., 400 to 800 nanometers.

Optionally the above-described coatings may be overlaid with an overcoating comprising ink-receptive organic film-forming polymer. The overcoating may be formed by applying an overcoating composition comprising a liquid medium and ink-receptive organic film-forming polymer dissolved or dispersed in the liquid medium and removing the liquid medium, as for example, by drying. Preferably the liquid medium is an aqueous solvent and the ink-receptive organic film-forming polymer is water-soluble poly(ethylene oxide) having a weight average molecular weight in the range of from 100,000 to 3,000,000, both of which have been described above in respect of earlier described embodiments of the invention. Water is an especially preferred aqueous solvent.

The relative proportions of liquid medium and organic film-forming polymer present in the overcoating composition may vary widely. The minimum proportion is that which will produce an overcoating composition having a viscosity low enough to apply as an overcoating. The maximum proportion is not governed by any theory, but by practical considerations such as the cost of the liquid medium and the cost and time required to remove the liquid medium from the applied wet overcoating. Usually, however, the weight ratio of liquid medium to film-forming organic polymer is from 18:1 to 50:1. Often the weight ratio is from 19:1 to 40:1. Preferably weight ratio is from 19:1 to 24:1.

Optional ingredients such as those discussed above may be present in the overcoating composition when desired.

The overcoating composition may be prepared by admixing the ingredients. It may be applied and dried using any of the coating and drying techniques discussed above. When an overcoating composition is to be applied, it may be applied once or a multiplicity of times.

Other than in the operating examples, or where otherwise indicated, all numbers expressing quantities of ingredients or reaction conditions used herein are to be understood as modified in all instances by the term "about".

The invention is further described in conjunction with the following examples which are to be considered illustrative rather than limiting, and in which all parts are parts by weight and all percentages are percentages by weight unless otherwise specified.

EXAMPLE 1

A poly(ethylene oxide) (PEO) solution was formed by dissolving 150 grams poly(ethylene oxide) having a weight average molecular weight of about 400,000 in 2850 grams of deionized water. The mixture was stirred until all poly (ethylene oxide) was dissolved.

To 100 grams of the above PEO solution was added 16.7 grams of a 30 percent by weight nonionic polyethylene sol (Poly Emulsion 316N30; ChemCor Inc., Chester, N.Y.). Into this mixture was added with stirring 35 milligrams (mg) Fluorad® FC-170-C surfactant (3M Company) to form a coating composition.

The coating composition was applied to poly(ethylene terephthalate) transparencies with a Meyer Rod #150 and dried in a Mathis Laboratory Drying and Curing Apparatus Type LTF (Werner Mathis AG, Zurich, Switzerland) at 115° C. for about 4½ minutes. The dry coating was about 20 micrometers thick and it was clear.

The coated transparencies were then printed on the coated side by a Hewlett-Packard 1600C inkjet printer and a Hewlett-Packard 850C inkjet printer. The inkjet printed transparencies exhibited excellent ability to maintain the edge acuity of ink patterns, excellent color fidelity, and were dry to touch as they came out of the printer. Pigmented black ink in the test patterns showed no cracking.

EXAMPLE 2

To 100 grams of a poly(ethylene oxide) solution prepared as described in Example 1 were added 16.7 grams of a 30 percent by weight cationic maleated polypropylene sol (Poly Emulsion 43C30; ChemCor Inc., Chester, N.Y.). Into this mixture was added with stirring 35 mg Fluorad® FC-170-C surfactant to form a coating composition.

The coating composition was applied to a 25.4 micrometer thick polypropylene film using a Meyer Rod #24 and dried in a Mathis Laboratory Drying and Curing Apparatus Type LTF at 105° C. for about 3½ minutes. The dry coating was about 1 to 2 micrometers thick and exhibited good adhesion to the polypropylene film as demonstrated by a lack of cracking or delamination during a 180 degree flex/bend test.

The coated polypropylene film was then printed on the coated side by a Hewlett-Packard 1600C inkjet printer and a Hewlett-Packard 850C inkjet printer. The printed film showed good image quality and high color fidelity.

EXAMPLE 3

To 100 grams of a poly(ethylene oxide) solution prepared as described in Example 1 were added 6.3 grams of a 40 percent by weight nonionic maleated polypropylene sol (Poly Emulsion 43N40; ChemCor Inc., Chester, N.Y.) and 8.3 grams of Poly Emulsion 316N30 30 percent by weight nonionic polyethylene sol. Into this mixture was added with stirring 35 mg Fluorad® FC-170-C surfactant to form a coating composition.

The coating composition was applied to sheets of Teslin® microporous material (PPG Industries, Inc., Pittsburgh, Pa.) with a Meyer Rod #150 and dried in a Mathis Laboratory Drying and Curing Apparatus Type LTF at 150° C. for about 3½ minutes. The dry coating was about 20 micrometers thick.

The coated sheets of Teslin® microporous material were then printed on the coated side by a Hewlett-Packard 1600C inkjet printer and a Hewlett-Packard 850C inkjet printer. The printed sheets showed excellent print quality.

EXAMPLE 4

The following initial charge and feeds shown in Table 1 were used in the preparation of aqueous secondary amine and hydroxyl functional acrylic polymer via solution polymerization technique.

TABLE 1

| Ingredients | Weight, grams |
|---|---|
| Initial charge | |
| Isopropanol | 130.0 |
| Feed 1 | |
| Isopropanol | 113.0 |
| n-Butyl acrylate | 69.2 |
| Methyl methacrylate | 153.0 |
| 2-(tert-Butylamino)ethyl methacrylate [CAS 3775-90-4] | 73.0 |
| Styrene | 69.2 |
| VAZO ® 67 Initiator[1] | 18.2 |
| Feed 2 | |
| Glacial acetic acid | 17.7 |
| Feed 3 | |
| Deionized water | 1085.0 |

[1] 2,2'-Azobis(2-methylbutanenitrile) initiator commercially available from E. I. du Pont de Nemours and Company, Wilmington, Delaware.

The initial charge was heated in a reactor with agitation to ref lux temperature (80° C.). Then Feed 1 was added in a continuous manner over a period of 3 hours. At the completion of Feed 1 addition, the reaction mixture was held at reflux for 3 hours. The resultant acrylic polymer solution had a total solids content of 61.7 percent (determined by weight difference of a sample before and after heating at 110° C. for one hour) and number average molecular weight of 4792 as determined by gel permeation chromatography using polystyrene as the standard. Thereafter, Feed 2 was added over five minutes at room temperature with agitation. After the completion of the addition of Feed 2, Feed 3 was added over 30 minutes while the reaction mixture was heated for azeotropic distillation of isopropanol. When the distillation temperature reached 99° C., the distillation was continued about one more hour and then the reaction mixture was cooled to room temperature. The total distillate collected was 550.6 grams. The product, which was a cationic acrylic polymer aqueous solution, had a solids content of 32.6 percent by weight (determined by weight difference of a sample before and after heating at 110° C. for one hour), and a pH of 5.25.

To 80 grams of a poly(ethylene oxide) solution prepared as described in Example 1 were added 10 grams of Poly Emulsion 43C30 30 percent by weight cationic maleated polypropylene sol and 10.3 grams of a separate batch of the above cationic acrylic polymer aqueous solution containing 29 percent by weight solids. Into this mixture was added with stirring 30 mg Fluorad® FC-170-C surfactant to form a coating composition.

The coating composition was applied to sheets of Teslin® microporous material with a Meyer Rod #150 and dried in a Mathis Laboratory Drying and Curing Apparatus Type LTF at 105° C. for about 3½ minutes. The dry coating was about 20 micrometers thick.

The coated sheets of Teslin® microporous material were then printed on the coated side by a Hewlett-Packard 1600C inkjet printer and a Hewlett-Packard 850C inkjet printer. The printed sheets showed excellent print quality.

EXAMPLE 5

To 100 grams of a poly(ethylene oxide) solution prepared as described in Example 1 were added 10 grams of Poly Emulsion 43C30 30 percent by weight cationic maleated polypropylene sol and 6.9 grams of the 29 percent by weight solids cationic acrylic polymer aqueous solution described above. Into this mixture was added with stirring 35 mg Fluorad® FC-170-C surfactant to form a coating composition.

The coating composition was applied to sheets of Teslin® microporous material with a Meyer Rod #150 dried in a Mathis Laboratory Drying and Curing Apparatus Type LTF at 105° C. for about 3½ minutes. The dry coating was about 20 micrometers thick.

The coated sheets of Teslin® microporous material were then printed on the coated side by a Hewlett-Packard 1600C inkjet printer and a Hewlett-Packard 850C inkjet printer. The printed sheets showed excellent print quality.

EXAMPLE 6

To 100 grams of a poly(ethylene oxide) solution prepared as described in Example 1 were added 6.7 grams of Poly Emulsion 43C30 30 percent cationic maleated polypropylene sol and 10 grams of Poly Emulsion 316N30 30 percent by weight nonionic polyethylene sol. Into this mixture was added with stirring 35 mg Fluorad® FC-170-C surfactant to form a coating composition.

The coating composition was applied to sheets of Teslin® microporous material with a Meyer Rod #150 and dried in a Mathis Laboratory Drying and Curing Apparatus Type LTF at 105° C. for about 3½ minutes. The dry coating was about 20 micrometers thick.

The coated sheets of Teslin® microporous material were then printed on the coated side by a Hewlett-Packard 1600C inkjet printer and a Hewlett-Packard 850C inkjet printer. The printed sheets showed excellent print quality.

EXAMPLE 7

To 100 grams of a poly(ethylene oxide) solution prepared as described in Example 1 were added 8.3 grams Poly Emulsion 316N30 30 percent by weight nonionic polyethylene sol and 8.6 grams of the 29 percent by weight solids cationic acrylic polymer aqueous solution described above. Into this mixture was added with stirring 35 mg Fluorad® FC-170-C surfactant to form a coating composition.

The coating composition was applied to sheets of Teslin® microporous material with a Meyer Rod #150 and dried in a Mathis Laboratory Drying and Curing Apparatus Type LTF at 105° C. for about 3½ minutes. The dry coating was about 20 micrometers thick.

The coated sheets of Teslin® microporous material were then printed on the coated side by a Hewlett-Packard 1600C inkjet printer and a Hewlett-Packard 850C inkjet printer. The printed sheets showed excellent print quality.

EXAMPLE 8

To 100 grams of a poly(ethylene oxide) solution prepared as described in Example 1 were added 10 grams of Poly Emulsion 43C30 30 percent by weight cationic maleated polypropylene sol and 13.6 grams of a 22 percent by weight alumina sol (Nyacol® AL-20; PQ Corporation; Valley Forge, Pa.). Into this mixture was added with stirring 35 mg Fluorad® FC-170-C surfactant to form a coating composition.

The coating composition was applied to sheets of Teslin® microporous material with a Meyer Rod #150 and dried in a Mathis Laboratory Drying and Curing Apparatus Type LTF at 105° C. for about 3½ minutes. The dry coating was about 20 micrometers thick.

The coated sheets of Teslin® microporous material were then printed on the coated side by a Hewlett-Packard 850C inkjet printer. The printed sheets showed excellent print quality.

EXAMPLE 9

To 83.3 grams of a 6 percent by weight poly(ethylene oxide) solution prepared similarly to that described in Example 1 were added 8.3 grams Poly Emulsion 316N30 30 percent by weight nonionic polyethylene sol and 7.5 grams Fluoropolymer Dispersion K-20 (Dupont Fluoroproducts; Wilmington, Del.) 33 percent by weight polytetrafluoroethylene sol. This mixture was stirred to form a homogeneous coating composition.

The coating composition was applied to poly(ethylene terephthalate) transparencies with a Meyer Rod #150 and dried in a Mathis Laboratory Drying and Curing Apparatus Type LTF at 115° C. for about 4½ minutes. The dry coating was about 20 micrometers thick and it was substantially clear.

The coated transparencies were then printed on the coated side a Hewlett-Packard 850C ink jet printer. The ink jet printed transparencies exhibited good edge acuity of ink patterns and excellent color fidelity. Pigmented black ink in the test patterns showed no cracking.

EXAMPLE 10

To 83.3 grams of the poly(ethylene oxide) solution described in Example 9 were added 8.75 grams Poly Emulsion 43N40 40 percent by weight nonionic maleated polypropylene sol and 4.5 grams Fluoropolymer Dispersion K-20 33 percent by weight polytetrafluoroethylene sol. This mixture was stirred to form a homogeneous coating composition.

The coating composition was applied to poly(ethylene terephthalate) transparencies with a Meyer Rod #150 and dried in a Mathis Laboratory Drying and Curing Apparatus Type LTF at 150° C. for about 4½ minutes. The dry coating was about 20 micrometers thick and it was substantially clear.

The coated transparencies were then printed on the coated side by a Hewlett-Packard 850C ink jet printer. The ink jet printed transparencies exhibited good edge acuity of ink patterns and excellent color fidelity. Pigmented black ink in the test patterns showed no cracking.

EXAMPLE 11

To 83.3 grams of the poly(ethylene oxide) solution described in Example 9 were added 4.5 grams Fluoropolymer Dispersion K-20 33 percent by weight polytetrafluoroethylene sol and 11.66 grams of Poly Emulsion 43C30 30 percent by weight cationic maleated polypropylene sol. This mixture was stirred to form a homogeneous coating composition.

The coating composition was applied to poly(ethylene terephthalate) transparencies with a Meyer Rod #150 and dried in a Mathis Laboratory Drying and Curing Apparatus Type LTF at 115° C. for about 4½ minutes. The dry coating was about 20 micrometers thick and it was substantially clear.

The coated transparencies were then printed on the coated side by a Hewlett-Packard 850C ink jet printer. The ink jet printed transparencies exhibited good edge acuity of ink patterns and excellent color fidelity. Pigmented black ink in the test patterns showed no cracking.

Although the present invention has been described with reference to specific details of certain embodiments thereof, it is not intended that such details should be regarded as limitations upon the scope of the invention except insofar as they are included in the accompanying claims.

We claim:

1. A printing medium comprising:
   (a) a substrate having at least one surface; and
   (b) a coating on the surface wherein the coating comprises:
      (1) binder comprising organic polymer, wherein poly(ethylene oxide) having a weight average molecular weight in the range of from 100,000 to 3,000,000 constitutes at least 20 percent by weight of the organic polymer of the binder and wherein the organic polymer of the binder constitutes from 20 to 80 percent by weight of the coating; and
      (2) finely divided substantially water-insoluble filler particles, of which at least 25 percent by weight are finely divided substantially water-insoluble nonfilm-forming thermoplastic organic polymer particles, wherein the filler particles have a maximum dimension of less than 500 nanometers, are distributed throughout the binder, and constitute from 20 to 80 percent by weight of the coating.

2. The printing medium of claim 1 wherein the filler particles have a maximum dimension of less than 100 nanometers.

3. The printing medium of claim 1 wherein the filler particles have a maximum dimension of less than 50 nanometers.

4. The printing medium of claim 1 wherein the filler particles constitute from 30 to 65 percent by weight of the coating.

5. The printing medium of claim 1 wherein at least 50 percent by weight of the finely divided substantially water-insoluble filler particles are finely divided substantially water-insoluble nonfilm-forming thermoplastic organic polymer particles.

6. The printing medium of claim 1 wherein at substantially 100 percent by weight of the finely divided substantially water-insoluble filler particles are finely divided substantially water-insoluble nonfilm-forming thermoplastic organic polymer particles.

7. The printing medium of claim 1 wherein the finely divided substantially water-insoluble nonfilm-forming thermoplastic organic polymer particles are finely divided substantially water-insoluble nonfilm-forming thermoplastic polyethylene particles.

8. The printing medium of claim 1 wherein the finely divided substantially water-insoluble nonfilm-forming thermoplastic organic polymer particles are finely divided substantially water-insoluble nonfilm-forming thermoplastic maleated polypropylene particles.

9. The printing medium of claim 1 wherein the poly(ethylene oxide) having a weight average molecular weight in the range of from 100,000 to 3,000,000 constitutes at least 51 percent by weight of the organic polymer of the binder.

10. The printing medium of claim 1 wherein the poly(ethylene oxide) having a weight average molecular weight in the range of from 100,000 to 3,000,000 constitutes at least 95 percent by weight of the organic polymer of the binder.

11. The printing medium of claim 1 wherein the coating is overlaid with an overcoating comprising ink-receptive organic polymer.

12. The printing medium of claim 1 wherein the thickness of the coating is in the range of from 5 to 40 micrometers.

13. A printing process which comprises applying liquid ink droplets to the printing medium of claim 1.

* * * * *